US012664814B2

(12) United States Patent　　　　(10) Patent No.: US 12,664,814 B2

Sharma et al.　　　　　　　　　　　(45) Date of Patent: Jun. 23, 2026

(54) FELINE COMFORT LEVEL CLASSIFICATION SYSTEM AND METHOD

(71) Applicant: SYLVESTER.AI INC., Calgary (CA)

(72) Inventors: Harsh Sharma, Calgary (CA); Navaneeth Kamballur Kottayil, Calgary (CA); Richard J. Becker, Calgary (CA); Susan Marie Groeneveld, Calgary (CA)

( * ) Notice: Subject to any disclaimer, the term of this patent is extended or adjusted under 35 U.S.C. 154(b) by 314 days.

(21) Appl. No.: 18/564,052

(22) PCT Filed: May 24, 2022

(86) PCT No.: PCT/CA2022/050823

§ 371 (c)(1),
(2) Date: Nov. 24, 2023

(87) PCT Pub. No.: WO2023/279197

PCT Pub. Date: Jan. 12, 2023

(65) Prior Publication Data

US 2024/0265723 A1　　Aug. 8, 2024

Related U.S. Application Data

(60) Provisional application No. 63/218,819, filed on Jul. 6, 2021.

(51) Int. Cl.
G06V 40/10 (2022.01)
G06V 10/764 (2022.01)
G06V 10/774 (2022.01)

(52) U.S. Cl.
CPC ............ G06V 40/10 (2022.01); G06V 10/764 (2022.01); G06V 10/774 (2022.01)

(58) Field of Classification Search
CPC ..... G06V 40/10; G06V 10/774; G06V 10/764
See application file for complete search history.

(56) References Cited

U.S. PATENT DOCUMENTS

| 10,592,732 B1 * | 3/2020 | Sather | G06N 3/045 |
| 10,657,383 B1 * | 5/2020 | Solh | G07C 9/00182 |

(Continued)

FOREIGN PATENT DOCUMENTS

| CN | 112257670 A | * | 1/2021 | G06F 18/214 |
| KR | 20210009778 A | * | 1/2021 | G06N 3/02 |
| KR | 202100080637 A | | 7/2021 | |

OTHER PUBLICATIONS

Evangelista, et al. "Facial expressions of pain in cats: the development and validation of a Feline Grimace Scale."; Scientific reports 9.1. (Year: 2019).*

(Continued)

*Primary Examiner* — Shaghayegh Azima

(74) *Attorney, Agent, or Firm* — McMillan LLP

(57) ABSTRACT

Disclosed herein is a method for generating a feline comfort level classification, the method comprising: receiving one or more images of a feline; generating a feline classification from the images with a feline classification model, wherein the feline classification corresponds to a feline type; selecting a face detection model from one or more face detection models, wherein the selected face detection model corresponds to the feline type; generating a positive facial indication for one or more of the images with the selected face detection model; selecting a comfort level classification model from one or more comfort level classification models, wherein the selected comfort level classification model corresponds to the feline type; and generating a feline comfort level classification from the images with the selected comfort level classification model.

17 Claims, 8 Drawing Sheets

(56)   References Cited

U.S. PATENT DOCUMENTS

| | | | | | |
|---|---|---|---|---|---|
| 11,194,999 | B2 * | 12/2021 | Xu | ........................ | G06V 40/161 |
| 2013/0022243 | A1 * | 1/2013 | Xu | ........................ | G06V 40/167 |
| | | | | | 382/103 |
| 2016/0070972 | A1 * | 3/2016 | Jang | ..................... | G06V 30/242 |
| | | | | | 382/110 |
| 2020/0250476 | A1 * | 8/2020 | Sather | .................. | G06V 10/764 |
| 2021/0271874 | A1 * | 9/2021 | Xiong | .................. | G06V 10/772 |

OTHER PUBLICATIONS

Finka et al. "The application of geometric morphometrics to explore potential impacts of anthropocentric selection on animals' ability to communicate via the face: the domestic cat as a case study" Frontiers in Veterinary Science. (Year: 2020).*

Finka, L.R., Luna, S.P., Brondani, J.T., et al. Geometric morphometrics for the study of facial expressions in non-human animals, using the domestic cat as an emplar. Sci Rep 9, 9883, 2019. https://doi.org/10.1038/s41598-019-46330-5.

* cited by examiner

FELINE COMFORT LEVEL CLASSIFICATION SYSTEM AND METHOD

CROSS-REFERENCE TO RELATED APPLICATIONS

This application claims the benefit under 35 U.S.C. § 119 of application No. 63/218,819, filed 6 Jul. 2021, and entitled FELINE COMFORT LEVEL CLASSIFICATION SYSTEM AND METHOD, which is hereby incorporated herein by reference for all purposes.

TECHNICAL FIELD

The present disclosure is directed to systems and methods of classifying a comfort level of a feline. More particularly, the present disclosure is directed to systems and methods of using machine-learning algorithms to classify a comfort level of a feline depicted in one or more images.

BACKGROUND

Determining a comfort level of a feline may aid in handling of the feline. Handling may include medical treatment and non-medical treatment. For example, if a feline is determined to be merely uncomfortable, the feline may be non-medically treated, such as commencing or ceasing petting of the feline, or changing the environment of the feline like relocating the feline. If a feline is determined to be in greater discomfort, for example pain, then the feline may be taken to a medical professional for medical treatment, and/or be medically examined for the cause of the pain.

A feline comfort level may be determined from the body language of a feline. Feline body language may include facial expressions, body posture, and body movements such as gait.

Felines exhibit a range of body language that is difficult for an individual to accurately classify with a comfort level. As such, determining a feline comfort level from feline body language is difficult for a layperson, and often difficult for a trained professional.

Images of a feline may be used to assist in classifying a feline comfort level. For example, one or more images of a feline may be captured and shown to a trained professional to determine a comfort level of the feline depicted in the images. However, the trained professional may not be available and/or able to review the images fast enough to address time sensitive issues with a feline, such as a feline requiring medical treatment.

Furthermore, determining a comfort level of a feline depicted in an image may be difficult even for a trained professional.

There is a general desire for an improved method and system for classifying a feline comfort level of a feline depicted in one or more images.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides a method for generating a feline comfort level classification, the method comprising: receiving one or more images of a feline; generating a feline classification from the images with a feline classification model, wherein the feline classification corresponds to a feline type; selecting a face detection model from one or more face detection models, wherein the selected face detection model corresponds to the feline type; generating a positive facial indication for one or more of the images with the selected face detection model; selecting a comfort level classification model from one or more comfort level classification models, wherein the selected comfort level classification model corresponds to the feline type; and generating a feline comfort level classification from the images with the selected comfort level classification model.

In some embodiments, the feline classification model comprises a machine-learning algorithm trained with a set of feline training images, wherein each of the feline training images comprises an image classified as either depicting a feline or not depicting a feline.

In some embodiments, the feline classification model comprises a machine-learning algorithm trained with a set of feline training images, wherein each of the feline training images comprises an image classified as depicting a feline of a feline type from a group of feline types, or not depicting a feline of any of the feline types.

In some embodiments, the group of feline types includes: brachycephalic, dolichocephalic, mesocephalic.

In some embodiments, the face detection model comprises a machine-learning algorithm trained with a set of facial training images, wherein each of the facial training images comprise an image classified as either depicting a face of the feline type or not depicting a face of the feline type.

In some embodiments, the selected comfort level classification model is a machine-learning algorithm trained with a set of comfort level training images, wherein each of the comfort level training images comprises an image classified with a comfort level. Each of the comfort level training images may be classified with a comfort level selected from a group comprising two or more of: no pain, mild discomfort, discomfort, extreme discomfort, pain, acute pain, and chronic pain.

In some embodiments, generating the feline classification comprises: generating a set of feline probabilities, wherein each of the feline probabilities corresponds to one of the images and comprises a feline type and a confidence interval; and generating the feline classification from the set of feline probabilities.

In some embodiments, generating the positive facial indication comprises: selecting the feline probabilities from among the set of feline probabilities with a confidence interval higher than the threshold confidence interval and a feline type corresponding to the feline classification; selecting the images corresponding to the selected feline probabilities; generating a set of facial probabilities, wherein each of the facial probabilities corresponds to one of the selected images and comprises a facial indication and a confidence interval; and generating the positive facial indication based at least in part on the set of facial probabilities.

In some embodiments, generating the feline comfort level classification comprises: selecting the feline probabilities from the set of feline probabilities with a confidence interval higher than a threshold and a feline type corresponding to the feline classification; selecting the images corresponding to the selected feline probabilities; generating a set of comfort level probabilities comprising, for each one of the selected images, a comfort level and a confidence interval; and generating the feline comfort level classification based at least in part on the set of comfort level probabilities.

In some embodiments, generating the feline comfort level classification from the set of comfort level probabilities comprises: selecting the comfort level probabilities from among the set of comfort level probabilities with a confidence interval higher than a threshold comfort confidence interval; averaging the confidence interval of each of the selected comfort level probabilities for each comfort level; and generating the feline comfort level classification based at least in part on the comfort level with the highest average confidence interval.

In addition to the exemplary aspects and embodiments described above, further aspects and embodiments will become apparent by reference to the drawings and by study of the following detailed descriptions. It is emphasized that the invention relates to all combinations of the above features, even if these are recited in different claims.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1:
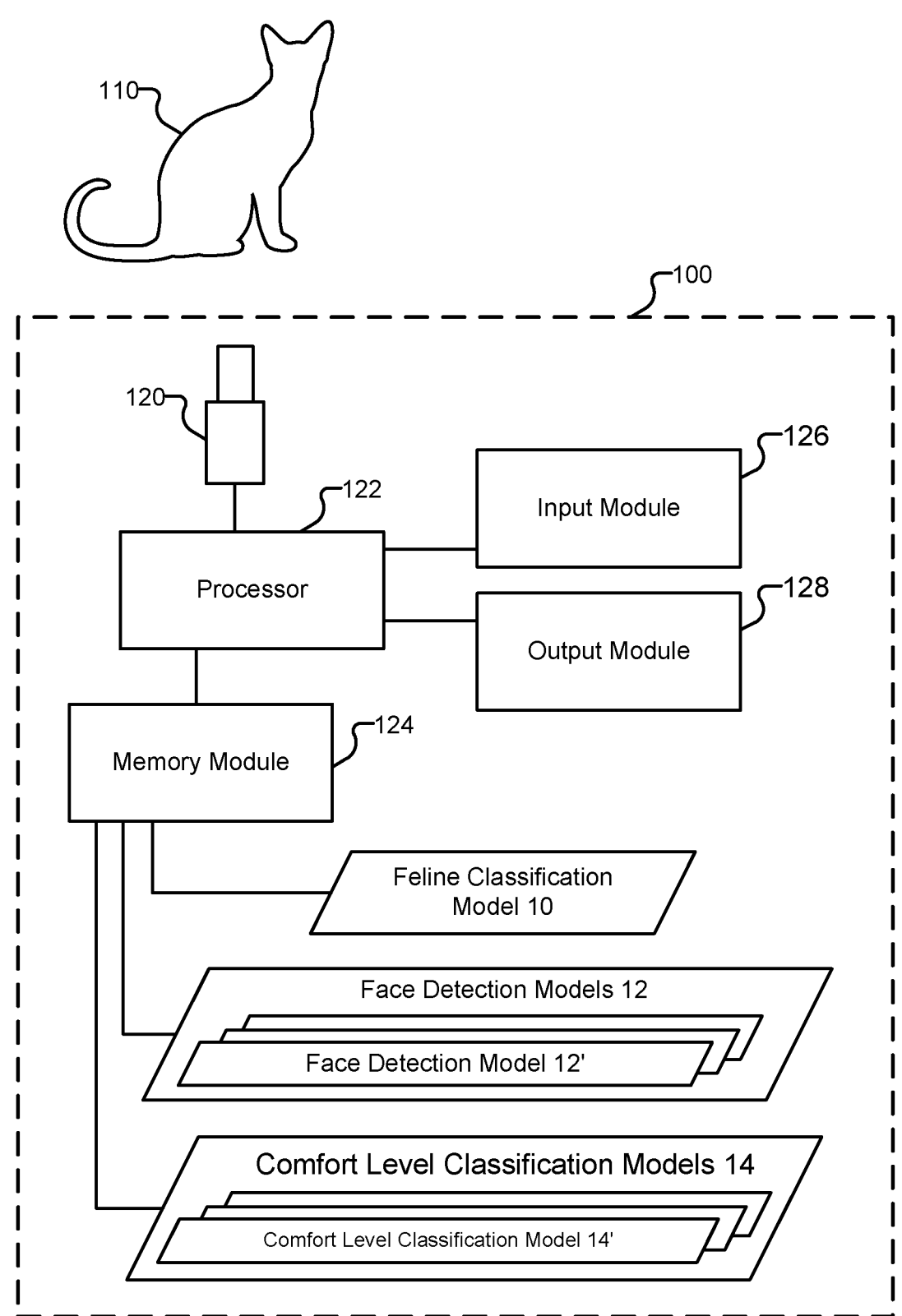
FIG. 1 is a schematic diagram of a system for classifying a comfort level of a feline according to an example embodiment of the present invention.

FIG. 1 is a schematic diagram of system 100 for classifying a comfort level of feline 110 according to an example embodiment of the present invention.

System 100 comprises image capture device 120, processor 122, memory module 124, input module 126, and output module 128. Image capture device 120, processor 122, memory module 124, input module 126, and output module 128 are communicatively coupled. Any or all of image capture device 120, processor 122, memory module 124, input module 126, and output module 128 may be provided by a single device, for example a smartphone, a tablet computer and/or the like. In some embodiments, one or more of and/or parts of image capture device 120, processor 122, memory module 124, input module 126 and/or output module 128 may be distributed over more than one device and communicatively coupled (e.g. over a communication network or otherwise). For example, a first portion of memory module 124 may be local to a smartphone and a second portion of memory module 124 may be resident on a server computer at some other location, and the smartphone and server computer may be in communicatively coupled over the internet.

Image capture device 120 may be arranged to view feline 110 and capture one or more images 18 of feline 110.

Memory module 124 stores feline classification model 10, one or more face detection models 12, and one or more comfort level classification models 14. Each of face detection models 12 and comfort level classification models 14 corresponds to one of one or more feline types. Feline types are described in more detail below.

Processor 122 of system 100 may be configured to:

receive, via input module 126, one or more commands, for example a start command;

capture, via image capture device 120, one or more images 18 (described in more detail below) of feline 110;

retrieve, via memory module 124, feline classification model 10;

execute feline classification model 10 to generate feline classification 22 (described in more detail below);

retrieve, via memory module 124, a particular face detection model 12' corresponding to feline classification 22 from among face detection models 12;

execute face detection model 12' to generate one or more facial indications;

retrieve, via memory module 124, a particular comfort level model 14' corresponding to feline classification 22 from among comfort level models 14;

execute comfort level model 14' to generate comfort level classification 30 (described in more detail below); and output, via output module 128, feedback based on comfort level classification 30.

The feedback provided by output module 128 may include audio, video and/or textual description of a feline comfort level. In some embodiments, the feedback may include handling suggestions and/or recommendations based in part on comfort level classification 30.

Feline classification 22 indicates the presence of a feline in images 18. In some embodiments, feline classification 22 may comprise a binary field, wherein one value of feline classification 22 indicates the presence of a feline in images 18, and another value of feline classification 22 indicates an absence of a feline in images 18.

In some embodiments, feline classification 22 indicates a feline type of a feline present in images 18, or an absence of a feline of any feline type in images 18. For example, feline classification 22 may indicate one of: no feline present, a feline present of a first type, a feline present of a second type, a feline present of neither the first type nor the second type, etc.

The feline type may correspond to one or more of: a species of feline, a breed of feline, or some other grouping of felines with similar characteristics. For example, feline classification 22 may be based on one or more physical characteristics of a feline, for example, a skull shape, hair type and/or the like. Where feline classification 22 corresponds to a skull shape of a feline, feline classification 22 may be one of: brachycephalic (short headed), dolichocephalic (long headed), and mesocephalic (neither long nor short headed).

Face detection models 12 comprise a set of models, each trained to generate a facial indication from one or more images 18. Each of face detection models 12 corresponds to a feline type that may be indicated by feline classification 22. For example, where feline classification 22 may indicate one of three types of felines (e.g. brachycephalic, dolichocephalic or mesocephalic), face detection models 12 comprise a set of three face detection models 12', each corresponding to one of the three types of felines (brachycephalic, dolichocephalic or mesocephalic) represented by feline classification 22.

In some embodiments, for example where feline classification 22 indicates either the presence or absence of a feline in images 18, face detection models 12 may comprise a single face detection model 12', which may be referred to herein as face detection model 12.

The facial indication generated by processor 122 using each of face detection models 12 indicates the presence or absence of a feline face in images 18 corresponding to the type of feline classification 22.

In some embodiments, face detection models 12 may also generate one or more position indications of one or more facial features of a feline face in images 18. For example, face detection models 12 may generate one or more position indications of one or more of: eyes, ears, mouth, nose, and whiskers of a feline depicted in images 18.

In some embodiments, processor 122 may overlay one or more of the position indications on one or more of images 18, and output images 18 overlaid with the position indications via output module 128.

In some embodiments, one or more of the position indications may be compared by processor 122 to one or more threshold feature positions to determine if the position indications are within the threshold feature positions. If the position indications are not within the threshold feature positions, processor 122 may output, via output module 128, feedback indicating that the position indication is not within the threshold feature positions. Processor 122 may overlay the threshold feature positions on one or more of images 18, and output images 18 overlaid with the threshold feature positions via output module 128.

Processor 122 may further generate a difference between the position indication and the threshold feature positions. Processor 122 may output, via output module 128, feedback based on the difference. For example, output module 128 may output visual and/or audio feedback describing how to conduct capture device 120 to generate an image of feline 110 with a lower difference. Visual and/or audio feedback may include one or more of:

an arrow indicating a direction in which to move (e.g. pan, tilt, and/or rotate) capture device 120;

a tone with a volume depending in part on the difference (e.g. louder for a higher difference and quieter for a lower difference); and/or the like.

Comfort level models 14 comprise a set of models 14', each trained to generate a comfort level classification from one or more images 18. Each comfort level model 14' from among comfort level models 14 corresponds to a feline type that may be indicated by feline classification 22. For example, where feline classification 22 may indicate one of three types of felines (e.g. brachycephalic, dolichocephalic or mesocephalic), comfort level models 14 may comprise a set of three comfort level models 14', each corresponding to one of the three types of felines (brachycephalic, dolichocephalic or mesocephalic).

Comfort level classification 30 may indicate two or more feline comfort levels. For example, comfort level classification 30 may indicate a comfort level of any of the following sets of feline comfort levels:

comfortable, uncomfortable;

comfortable, low discomfort, high discomfort;

no pain, pain;

no pain, acute pain;

no pain, chronic pain;

no pain, acute pain, chronic pain;

no pain, minimal pain, high pain;

no discomfort or pain, discomfort, pain; and a number between a minimum and a maximum, for example an integer between 1 and 10, where a lower number indicates a lower level of pain/discomfort, and a higher number indicates a higher level of pain/discomfort.

In some embodiments, comfort level classification 30 may indicate a type of feline comfort, and a magnitude of the type of feline comfort. For example, comfort level classification 30 may indicate one or more of the following:

either of the types: no pain, or pain; and if indicates pain, a number, for example an integer between 1 and 10, wherein a lower integer indicates lesser pain and a higher integer indicates greater pain; and one of the types: no pain, acute pain, or chronic pain; and if indicates either acute pain or chronic pain, a number, for example an integer, wherein a lower integer indicates a lesser acute/chronic pain and a higher integer indicates greater acute/chronic pain.

Comfort level classification models 14 may be configured to classify a comfort level of a feline depicted in an image based on one more visually perceptible physical features of the feline. In some embodiments, one or more of comfort level classification models 14 are configured to classify a comfort level of a feline depicted in an image based on one or more of: whisker position, head position, ear position, muzzle shape, and/or the like.

Figure 2A:
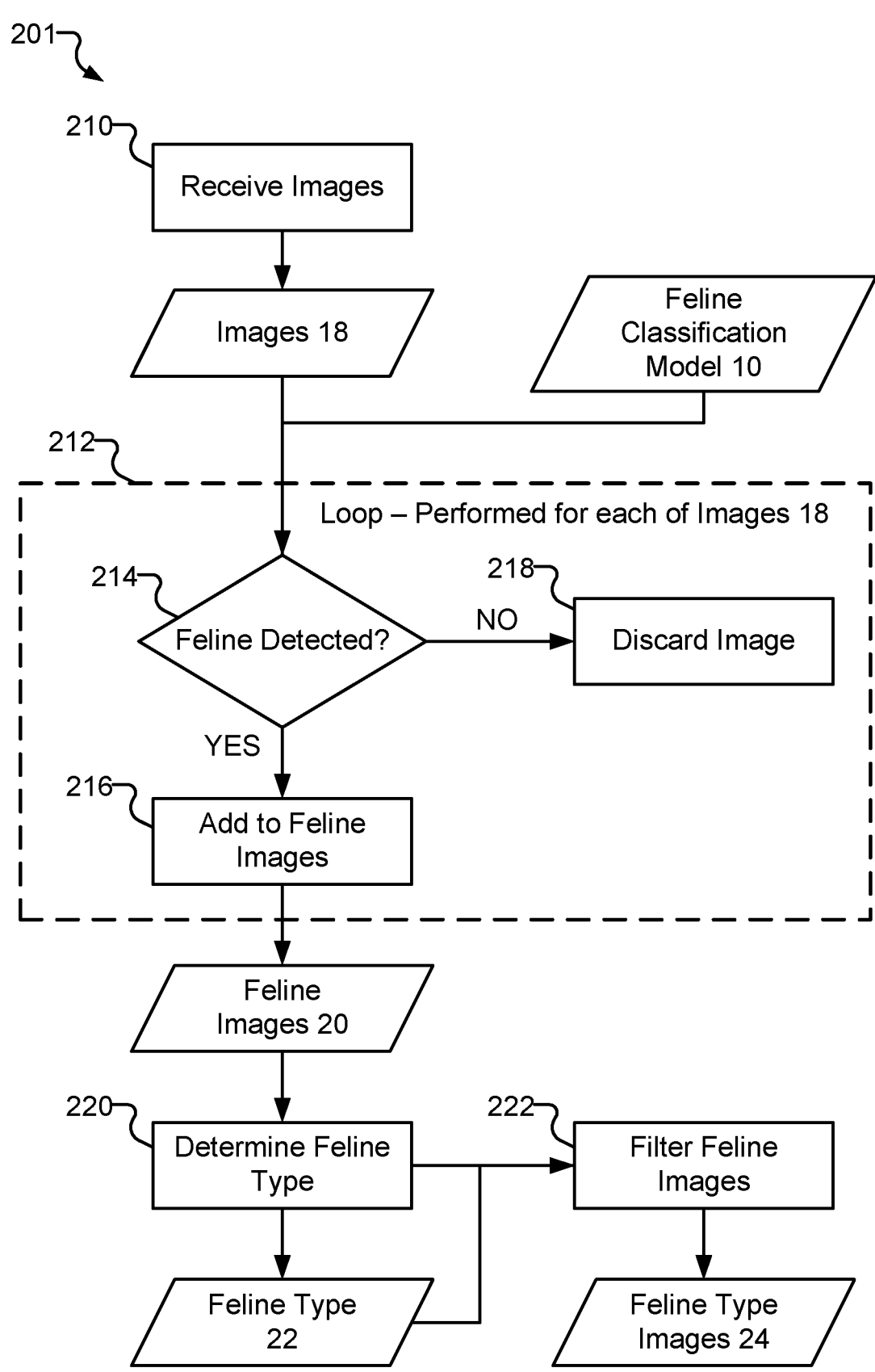
FIGS. 2A to 2C are schematic diagrams of a method for generating a comfort level classification according to an example embodiment of the present invention.
Figure 2B:
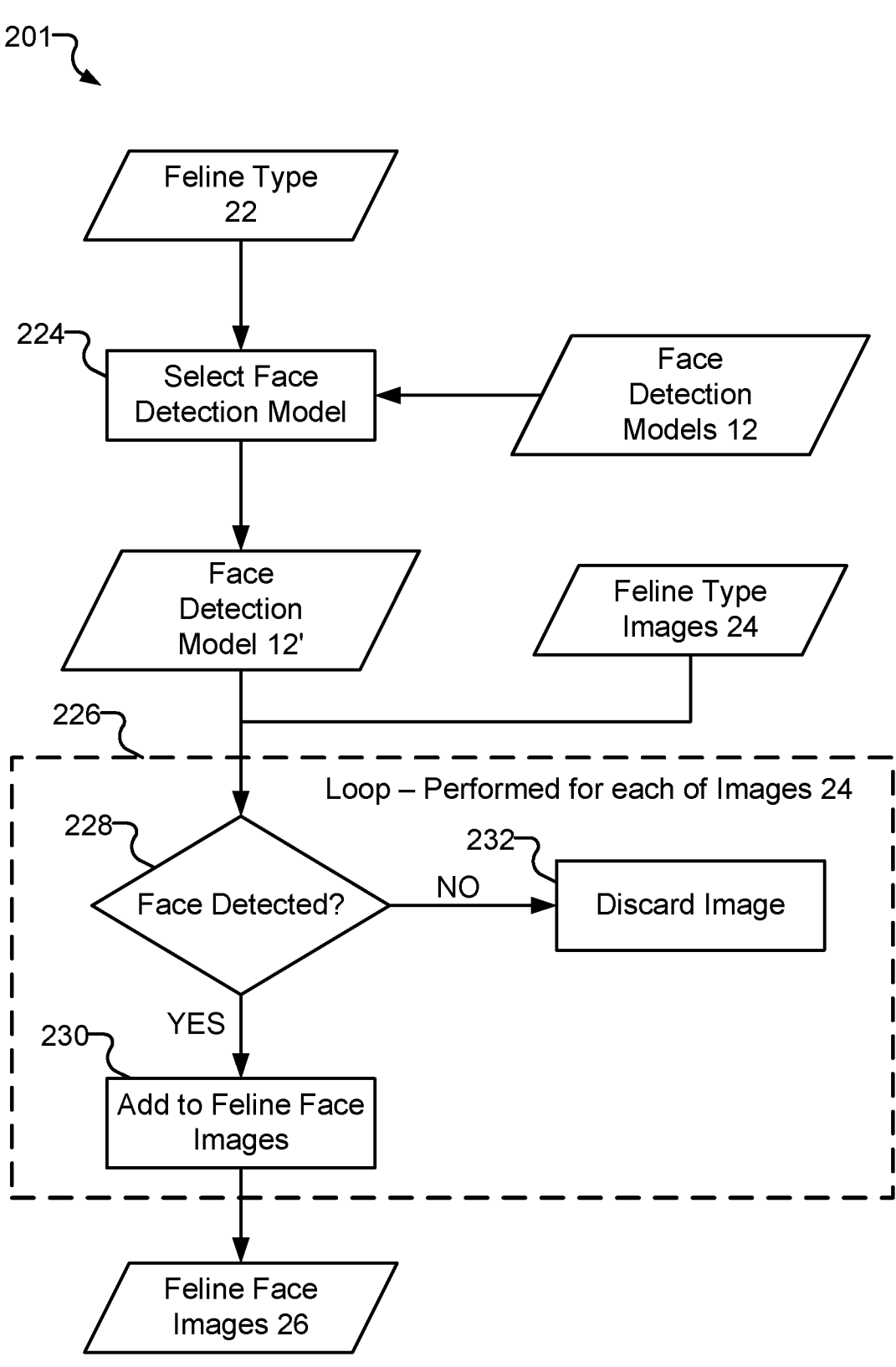
Figure 2C:
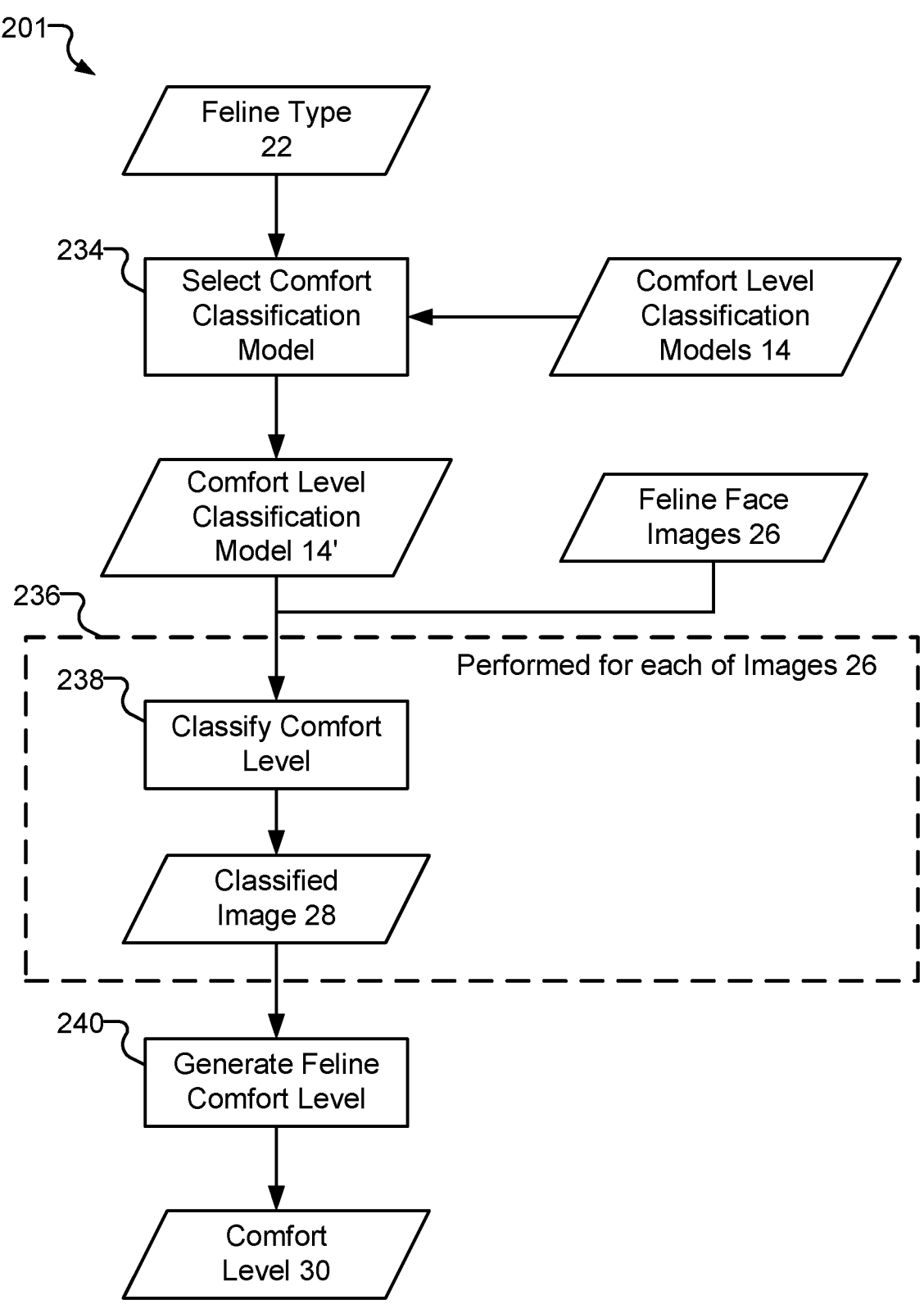

FIGS. 2A to 2C are schematic diagrams of method 201 for generating comfort level classification 30 according to an example embodiment of the present invention. In some embodiments, method 201 may be performed by system 100. In some embodiments, memory module 124 may store computer readable instructions that when executed by processor 122 cause system 100 to perform method 201.

Step 210 of method 201 comprises receiving images 18. In some embodiments, step 210 comprises capturing images 18 with image capture device 120.

Method 201 then proceeds to loop 212, wherein loop 212 is performed for each of images 18. Each of images 18 may be referred to herein as an image 18'. Loop 212 comprises step 214, generating a feline indication for image 18' of images 18 using feline classification model 10 (FIG. 1). Feline classification model 10 may comprise a machine-learning model trained to generate a feline indication for image 18'. The output of feline classification model 10 may indicate the presence of a feline or the absence of a feline in image 18'. In some embodiments, feline classification model 10 may indicate a type of feline in addition to or as an alternative to a presence of a feline in image 18'.

Where feline classification model 10 indicates a presence of a feline in image 18', method 201 proceeds to step 216, and adds image 18' to set of feline images 20. Where feline classification model 10 indicates an absence of a feline in image 18', method 201 proceeds to step 218, and discards image 18'.

Once loop 212 is performed for each of images 18 (or for a suitable threshold number of images 18, for example 100 images), method 201 proceeds to step 220, which comprises determining feline type 22. Step 220 may also involve the use of feline classification model 10. Where the use of feline classification model 10 in step 220 classifies all of feline images 20 with the same feline type, step 220 may involve setting feline type 22 to the feline type of images 20. However, where the use of feline classification model 10 in step 220 classifies two or more of feline images 20 with a plurality of feline types, step 220 may comprise selecting one of the plurality of feline types to be feline type 22.

In some embodiments, step 220 may comprise selecting feline type 22 based at least in part on the most common feline type from among the plurality of classified feline types of images 20.

In some embodiments, the use of feline classification model 10 in step 220 may generate a confidence interval and a feline type for each of images 20. Where each of images 20 has an associated feline type and confidence interval, step 220 may comprise selecting the feline type 22 from the plurality of feline types of images 20 based at least in part on the confidence intervals associated with images 20.

For example, step 220 may comprise:

selecting images 20 with an associated confidence interval over a threshold confidence interval, for example 80%;

grouping the selected images 20 by associated feline type;

selecting the groups of images 20 with a number of images over a threshold group size, for example 10 images;

averaging the confidence intervals for each of the selected groups; and selecting feline type 22 based at least in part on the feline type of the group with the highest average confidence interval.

Method 201 then proceeds to step 222, which involves filtering images 20 for only the images matching feline type 22 (or having a confidence interval matching feline type 22 that is greater than a configurable threshold). The set of images 20 matching feline type 22 output from step 222 is feline type images 24.

Step 224 (FIG. 2B) of method 201 comprises selecting face detection model 12' from among face detection models 12. Face detection models 12 comprise a set of face detections models, where each face detection model 12' from among face detections models 12 is associated with a feline type. Step 224 comprises selecting face detection model 12' associated with a feline type corresponding to feline type 22.

Method 201 then proceeds to loop 226, wherein loop 226 is performed for each of feline type images 24. Each feline type image from among feline type images 24 may be referred to as feline type image 24'. Loop 226 comprises step 228, which involves generating a facial indication for image 24' of images 24 using face detection model 12'.

Face detection model 12' may comprise a machine-learning model trained to generate a facial indication for an image. The output of face detection model 12' in step 228 may indicate the presence of a face of feline type 22 or the absence of a face of feline type 22 in each feline type image 24'.

Where face detection model 12' in step 228 indicates a presence of a face in a feline type image 24', method 201 proceeds to step 230, and adds the feline type image 24' to set of feline face images 26. Where face detection model 12' in step 228 indicates an absence of a face in the feline type image 24', method 201 proceeds to step 232, and discards the feline type image 24'.

In some embodiments, method 201 comprises generating a positive facial indication from feline face images 26. Generating a positive facial indication may comprise: generating a set of feline probabilities comprising, for each of the feline face images 26, a feline type and a confidence interval; selecting the feline probabilities from among the set of feline probabilities with a confidence interval higher than a threshold confidence interval and a feline type corresponding to the feline classification; selecting the images corresponding to the selected feline probabilities; generating a set of facial probabilities, wherein each of the facial probabilities corresponds to one of the selected images and comprises a facial indication and a confidence interval; and generating the positive facial indication from the set of facial probabilities.

In some embodiments, generating a positive facial indication may comprise: selecting the facial probabilities from the set of facial probabilities with a confidence interval higher than a threshold confidence interval; averaging the confidence interval of each of the selected facial probabilities; and comparing the average confidence interval to a positive facial indication threshold.

Once loop 226 is performed for each of feline type images 24, method 201 proceeds to step 234 (FIG. 2C), which involves selecting a particular comfort level classification model 14' from among comfort level classification models 14. Comfort level classification models 14 comprises a set of individual comfort level classification models 14', where each individual comfort level classification model 14' is associated with a particular feline type.

Step 234 comprises selecting comfort level classification model 14' associated with a feline type corresponding to feline type 22.

Method 201 then proceeds to loop 236, wherein loop 236 is performed for each of feline face images 26. Each feline face image from among feline face images 26 may be referred to as feline face image 26'. Loop 236 comprises step 238, which involves generating a comfort level classification for each feline face image 26' from among feline face images 26 using comfort level classification model 14'. Comfort level classification model 14' may comprise a machine-learning model trained to generate a comfort level classification for an image. The output of comfort level classification model 14' in step 238 may comprise a comfort level classification and a confidence interval (shown as classified image 28 in FIG. 2C).

Once loop 236 is performed for each of feline images 26, method 201 proceeds to step 240, generating comfort level 30 from the set of classified images 28 (one classified image 28 for each of feline face images 26).

Step 240 may comprise:

selecting images 28 with an associated confidence interval over a threshold confidence interval, for example 80%;

grouping the selected images 28 by associated comfort level;

selecting the groups of images 28 with a number of images over a threshold group size, for example 10 images;

averaging the confidence intervals for each of the selected groups; and generating comfort level 30 by selecting the comfort level of the group with the highest average confidence interval.

Figure 3:
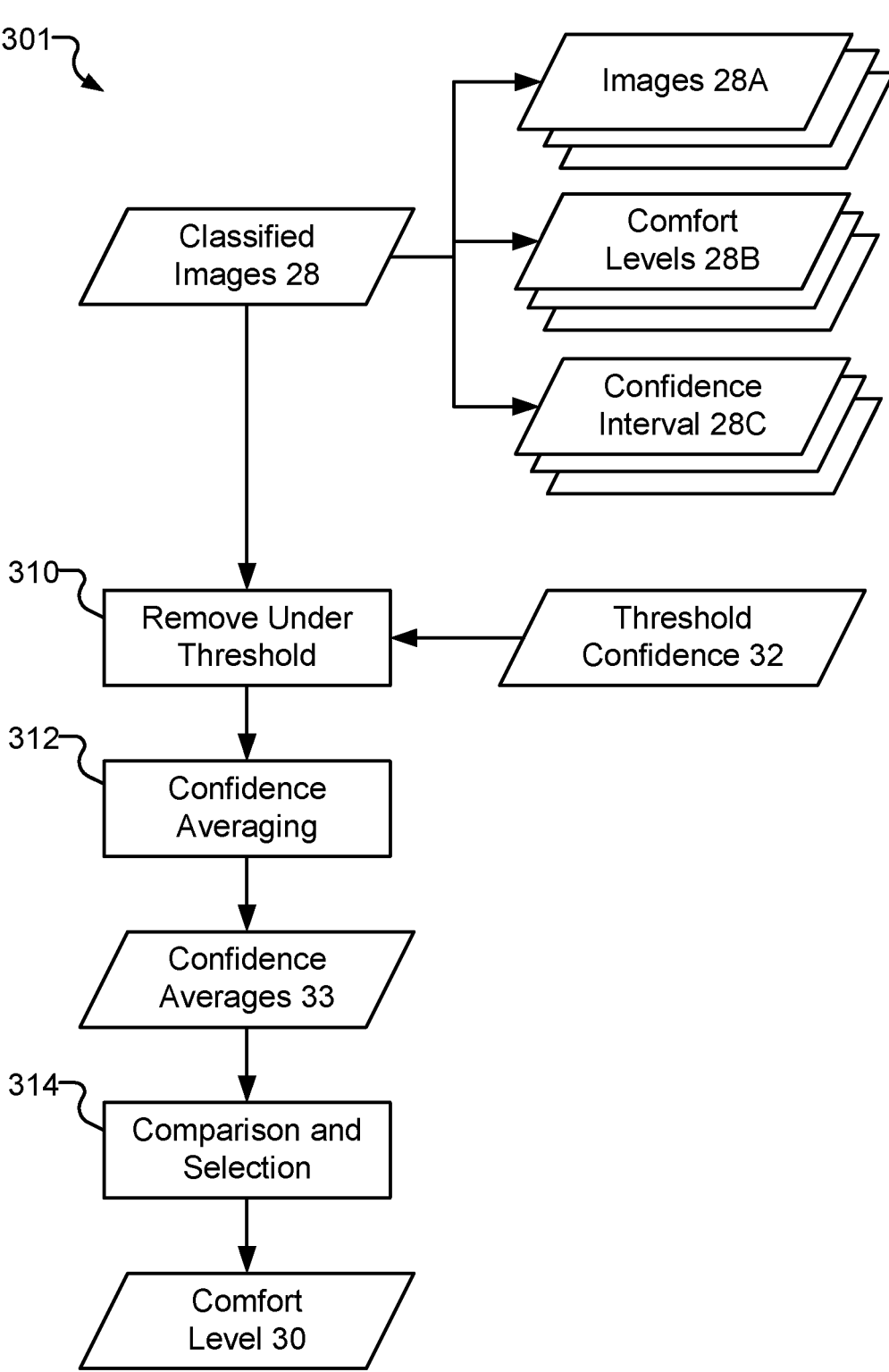
FIG. 3 is a schematic diagram of a method for generating a comfort level from one or more classified images according to an example embodiment of the present invention.

FIG. 3 is a schematic diagram of method 301 for generating comfort level 30 from classified images 28 according to a particular example embodiment. Method 300 may be performed in step 240 (FIG. 2C), for example. In some embodiments, classified images 28 comprise set of images 28A and corresponding comfort levels 28B and confidence intervals 28C. Confidence intervals 28C represent statistical likelihoods that corresponding images 28A depict a feline with corresponding comfort levels 28B.

Step 310 comprises removing individual images 28A from classified images 28 if the associated confidence interval 28C for that image 28A is below a threshold confidence interval 32. In some embodiments, confidence intervals 28C represent percentages, and threshold confidence interval 32 is a minimum percentage, for example 80%. The remainder of method 300 involves working with the subset of classified images 28 with the low-confidence-level images removed.

Step 312 comprises averaging the confidence intervals 28C for each distinct comfort level from among comfort levels 28B in the subset of classified images 28 with the low-confidence-level images removed to generate confidence averages 33 for each distinct comfort level from among comfort levels 28B.

Step 314 comprises comparing and selecting one of the comfort levels of confidence averages 33 to generate comfort level 30. For example, comfort level 30 may be based at least in part on the comfort level with the highest of confidence average 33.

In some embodiments, comfort level 30 may be based at least in part on the comfort level 28B associated with the greatest number of images from among the subset of classified images 28 with the low-confidence-level images removed.

In some embodiments of system 100, processor 122 is configured to:

operate image capture device 120 to repeatedly captures images 18;

perform method 201 for each of images 18 captured by image capture device 120;

generate a comfort level 30 based at least in part on a number of captured images 18; and output comfort level 30 via output module 128.

Where system 100 repeatedly captures images 18, system 100 may be configured to generate and output comfort level 30 based on a trailing set of images 18. In some embodiments, system 100 generates and outputs comfort level 30 based on a configurable number of the most recently captured of images 18, for example, the most recent twenty images captured by capture device 120.

Some embodiments of system 100 are configured to generate and output comfort level 30 of a feline in view of image capture device 120 in real-time. Real-time may mean generating a comfort level 30 at least once every period, wherein a period may be a fraction of a second, for example 100 milliseconds.

Where system 100 is configured to generate and output comfort level 30 in real-time, system 100 may be configured to generate an initial comfort level 30', and generate an updated comfort level 30" each period.

System 100 may generate initial comfort level 30' by:

operating image capture device 120 to capture an initial number of images 18', for example 20 initial images 18'; and performing method 201 to generate initial comfort level 30' from initial images 18'.

Once system 100 generates initial comfort level 30', system 100 may generate updated comfort level 30" each period by, within a period:

operating image capture device 120 to capture one or more update images 18";

adding update images 18" to the set of initial images 18' and any previously captured updated images 18" to generate a combined set of images;

performing method 201 to generate updated comfort level 30" from a most recent number of images in the combined set of images, for example, the most recent 20 images;

Generating and outputting comfort level 30 in real-time may facilitate real-time handling of a feline. For example, a real-time comfort level 30 may be monitored as a pain relief treatment is gradually administered to a feline to determine, at least in part, when the pain relief treatment has begun to take effect over the feline. In another example, a real-time comfort level 30 may be monitored to determine, at least in part, whether a feline has less or more discomfort from one or a another type of physical handling, for example longitudinal petting or lateral petting.

Figure 4:
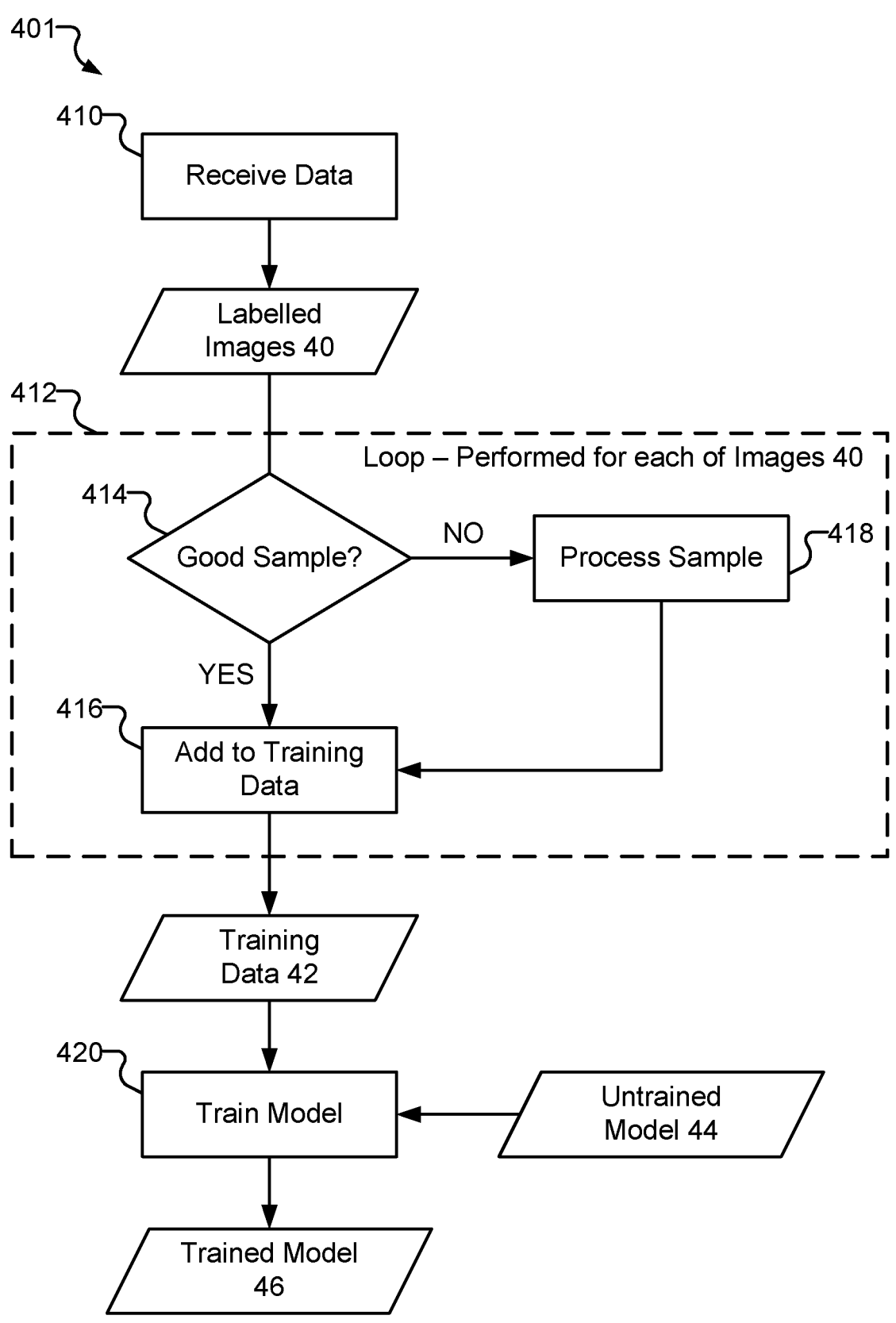
FIG. 4 is a schematic diagram of a method for generating training data and a trained model according to an example embodiment of the present invention.

FIG. 4 is a schematic diagram of method 401 for generating training data 42 and trained model 46 according to a particular example embodiment. In some embodiments, method 401 may be performed to generate one or more of: feline classification model 10, face detection models 12, and comfort level classification models 14.

Method 401 comprises step 410, receiving labelled images 40. Labelled images 40 may be received from a database of manually labelled images, or generated by performing one or more steps of method 201.

Method 401 proceeds to loop 412, wherein loop 412 is performed for each individual labelled image 40' in the plurality of labelled images 40. Loop 412 comprises step 414, which involves evaluating a sample quality of labelled image 40'. The step 414 evaluation of the sample quality of labelled image 40' may comprise evaluating whether labelled image 40' exhibits one or more of:

a minimum resolution of image 40';

a minimum color balance of image 40';

an orientation range of an object, for example a feline or a feline face, depicted in image 40';

a minimum contrast of image 40';

a minimum brightness of image 40';

a minimum clarity of image 40';

a maximum number of objects, for example a maximum number of felines or feline faces, depicted in image 40'; and a quality label generated from image 40' by a trained machine learning model.

In some embodiments, step 414 may comprise generating a quality indication of image 40' with a quality evaluation model, wherein the quality evaluation model is a model trained on a set of images labelled as good or poor quality.

If step 414 determines image 40' meets the requisite sample quality (e.g. the quality indication indicates good quality), method 401 proceeds to step 416, which involves adding image 40' to training data 42. If step 414 determines image 40' does not meet the requisite sample quality (e.g. the quality indication indicates poor quality), method 401 proceeds to step 418, which involves processing image 40'. Step 418 may comprise:

rotating image 40';

cropping image 40';

flipping image 40';

brightening image 40';

adjust the contract of image 40';

sharpen image 40'; and editing image 40' based on an output of a trained machine learning model.

In some embodiments, step 418 comprises editing image 40' with an image editing model, wherein the image editing model is a model trained on a set of poor quality images and associated edited images.

After step 418 has been performed for image 40', processed image 40' is added to training data 42 by step 416 if processed image 40' meets the requisite sample quality.

Once loop 412 is performed for a desired number of labelled images 40, method 401 proceeds to step 420, which involves training untrained model 44 to generate trained model 46.

Training data 42 may comprise one or more of:

feline training images, wherein each of the feline training images comprises an image classified as either depicting a feline or not depicting a feline;

feline training images, wherein each of the feline training images comprises an image classified as depicting a feline of a feline type from a group of feline types, or not depicting a feline of any of the feline types;

facial training images, wherein each of the facial training images comprise an image classified as either depicting a face of the feline type or not depicting a face of the feline type; and comfort level training images, wherein each of the comfort level training images comprises an image classified with a comfort level.

In some embodiments, step 420 may comprise supervised learning, unsupervised learning, or semi-supervised learning.

Figure 5A:
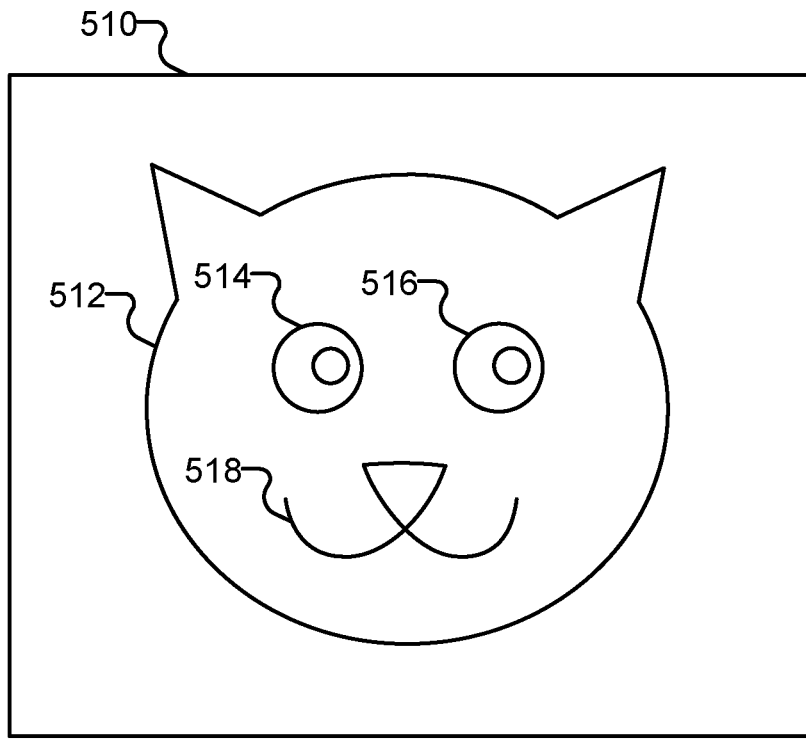
FIGS. 5A and 5B are schematic diagrams of an image depicting a feline face.
Figure 5B:
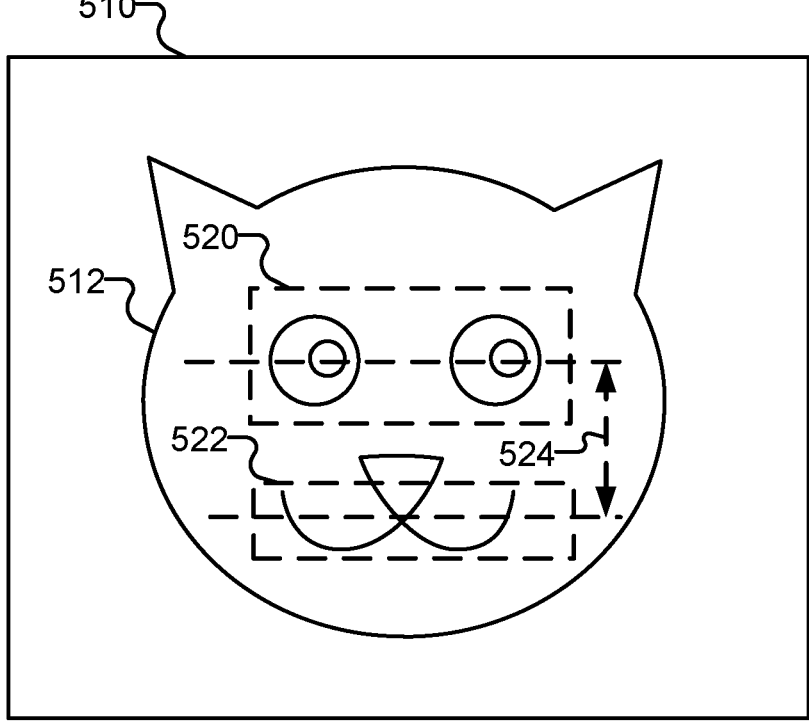

FIGS. 5A and 5B are example schematic diagrams of an exemplary image 510 depicting feline face 512. In some embodiments, one or more features of feline face 512 may be used to classify image 510 as depicting a feline (e.g. in step 214 and/or feline classification model 10, for example). For example, eyes 514 and 516, and mouth 518 of feline face 512 may be used to classify image 510 as depicting a feline.

FIG. 5B depicts bounding box 520 drawn around eyes 514 and 516, and bounding box 522 drawn around mouth 518. In some embodiments, distance 524 between bounding box 520 and bounding box 522 may be used to determine one or more of a depiction of a feline in image 510, a feline type of a feline depicted in image 510, the presence of a feline face of a feline type in image 510, and a comfort level of a feline depicted in image 510.

In some embodiments, one or more of images 18 may be specially cropped. For example, where one or more of images 18 are found to depict a feline face, a boundary of the feline face may be identified in the image, and portions of the image outside of the boundary of the feline face may be cropped from the image.

Figure 5C:
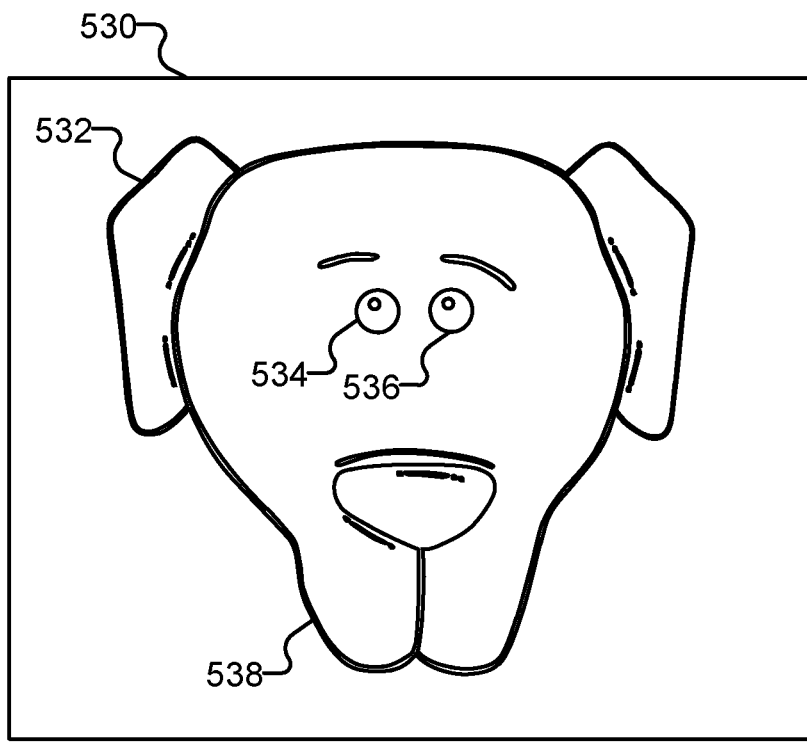
FIGS. 5C and 5D are schematic diagrams of an image depicting a non-feline face.
Figure 5D:
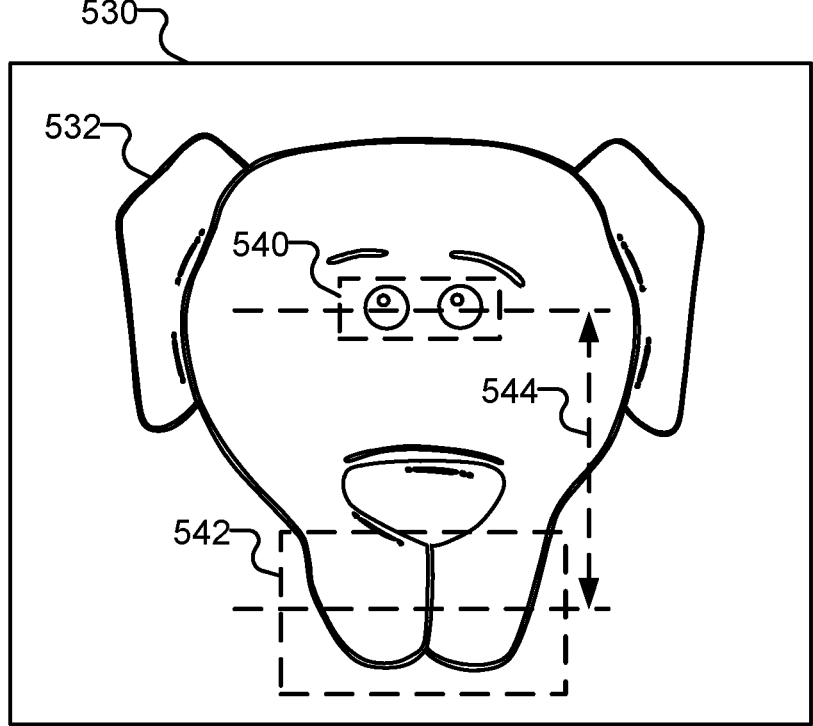

FIGS. 5C and 5D are schematic diagrams of image 530 depicting non-feline face 532. One or more features of non-feline face 532 may be used to classify image 530 as not depicting a feline (e.g. in step 214 and/or feline classification model 10, for example). For example, eyes 534 and 536, and mouth 538 of non-feline face 532 may be used to classify image 530 as not depicting a feline.

FIG. 5D depicts bounding box 540 drawn around eyes 534 and 536, and bounding box 542 drawn around mouth 538. In some embodiments, distance 544 between bounding box 540 and bounding box 542 may be used to classify image 530 as not depicting a feline.

Some Embodiments

One or more embodiments of the present invention may comprise one or more of:

a computer system configured to perform one or more of the methods disclosed herein; and a computer readable memory storing machine-readable instructions that when performed by a computer system cause the computer system to perform one or more of the methods disclosed herein.

One or more embodiments of the present invention are described as comprising one or more models. As used herein, a model may comprise any combination of computer hardware and computer software configured to provide the described functionality. For example, a model may comprise:

a sequence of computer instructions;

a look-up table; and a trained machine-learning algorithm.

In some embodiments of the present invention, method 201 is performed by a mobile device, for example a smartphone. In such embodiments, models 10, 12 and 14 may be stored in a memory module 124 of the smartphone, and executed by a processor 122 of the smartphone. In some embodiments, method 201 is performed, and thereby models 10, 12 and 14 are executed, by a smartphone within a certain time period, for example within 5 seconds, or within 100 milliseconds.

One or more embodiments of the present invention may comprise, via output module 128, outputting information based at least in part on a comfort level 30. Such information may comprise, one or more questions, the answers to which may prompt system 100 to output further information, for example:

where comfort level 30 indicates discomfort, one or more questions to assist in identifying a source of potential discomfort;

where comfort level 30 indicates pain or extreme discomfort, one or more questions to assist in determining if and what kind of medical treatment should be considered; and/or the like.

In one or more embodiments;

output module 128 comprises one or more of: a display and a speaker; and input module 126 comprises one or more of: a touch screen and a keyboard.

In some embodiments, one or more threshold confidence intervals may be:

a range, for example: between 80% and 95%, or the like;

a threshold floor, for example: over 60%, over 75%, over 80%, or the like; and a threshold ceiling, for example: under 50%, under 75%, under 95%, or the like.

Interpretation of Terms

Unless the context clearly requires otherwise, throughout the description and the "comprise", "comprising", and the like are to be construed in an inclusive sense, as opposed to an exclusive or exhaustive sense; that is to say, in the sense of "including, but not limited to";

"connected", "coupled", or any variant thereof, means any connection or coupling, either direct or indirect, between two or more elements; the coupling or connection between the elements can be physical, logical, or a combination thereof;

"herein", "above", "below", and words of similar import, when used to describe this specification, shall refer to this specification as a whole, and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Embodiments of the invention may be implemented using specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs")). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a control circuit for a device may implement methods as described herein by executing software instructions in a program memory accessible to the processors.

Processing may be centralized or distributed. Where processing is distributed, information including software and/or data may be kept centrally or distributed. Such information may be exchanged between different functional units by way of a communications network, such as a Local Area Network (LAN), Wide Area Network (WAN), or the Internet, wired or wireless data links, electromagnetic signals, or other data communication channel.

For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

Software and other modules may reside on servers, workstations, personal computers, tablet computers, image data encoders, image data decoders, PDAs, color-grading tools, video projectors, audio-visual receivers, displays (such as televisions), digital cinema projectors, media players, and other devices suitable for the purposes described herein. Those skilled in the relevant art will appreciate that aspects of the system can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics (e.g., video projectors, audio-visual receivers, displays, such as televisions, and the like), set-top boxes, color-grading tools, network PCs, mini-computers, mainframe computers, and the like.

The invention may also be provided in the form of a program product. The program product may comprise any non-transitory medium which carries a set of computer-readable instructions which, when executed by a data processor, cause the data processor to execute a method of the invention. Program products according to the invention may be in any of a wide variety of forms. The program product may comprise, for example, non-transitory media such as magnetic data storage media including floppy diskettes, hard disk drives, optical data storage media including CD ROMs, DVDs, electronic data storage media including ROMs, flash RAM, EPROMs, hardwired or preprogrammed chips (e.g., EEPROM semiconductor chips), nanotechnology memory, or the like. The computer-readable signals on the program product may optionally be compressed or encrypted.

In some embodiments, the invention may be implemented in software. For greater clarity, "software" includes any instructions executed on a processor, and may include (but is not limited to) firmware, resident software, microcode, and the like. Both processing hardware and software may be centralized or distributed (or a combination thereof), in whole or in part, as known to those skilled in the art. For example, software and other modules may be accessible via local memory, via a network, via a browser or other application in a distributed computing context, or via other means suitable for the purposes described above.

Where a component (e.g. a model, a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

The invention claimed is:

1. A method for generating a feline comfort level classification, the method comprising:
   receiving one or more images of a feline;
   generating a feline classification from the images with a feline classification model, wherein the feline classification corresponds to a feline type;
   selecting a face detection model from one or more face detection models, wherein the selected face detection model corresponds to the feline type;
   generating a positive facial indication for one or more of the images with the selected face detection model;
   selecting a comfort level classification model from one or more comfort level classification models, wherein the selected comfort level classification model corresponds to the feline type; and
   generating a feline comfort level classification from the images with the selected comfort level classification model;
   wherein generating the feline classification comprises:
      generating a set of feline probabilities, wherein each of the feline probabilities corresponds to one of the images and comprises a feline type and a confidence interval; and
      generating the feline classification from the set of feline probabilities;
   wherein generating the feline classification from the set of feline probabilities comprises:
      selecting the feline probabilities from the set of feline probabilities with a confidence interval higher than a first threshold confidence interval;
      grouping the selected feline probabilities by feline type;

averaging the confidence intervals of the feline probabilities in each feline type group; and
generating the feline classification based at least in part on the feline type of the group with the highest average confidence interval.

2. The method according to claim 1, wherein the feline classification model comprises a machine-learning algorithm trained with a set of feline training images, wherein each of the feline training images comprises an image classified as either depicting a feline or not depicting a feline.

3. The method according to claim 1, wherein the feline classification model comprises a machine-learning algorithm trained with a set of feline training images, wherein each of the feline training images comprises an image classified as depicting a feline of a feline type from among a group of two or more feline types, or not depicting a feline of any of the feline types.

4. The method according to claim 3, wherein the group of feline types includes: brachycephalic, dolichocephalic, and mesocephalic.

5. The method according to claim 1, wherein the face detection model comprises a machine-learning algorithm trained with a set of facial training images, wherein each of the facial training images comprise an image classified as either depicting a face of the feline type or not depicting a face of the feline type.

6. The method according to claim 1, wherein the selected comfort level classification model is a machine-learning algorithm trained with a set of comfort level training images, wherein each of the comfort level training images comprises an image classified with a comfort level.

7. The method according to claim 6, wherein each of the comfort level training images is classified with a comfort level selected from a group comprising two discrete comfort levels.

8. The method according to claim 6, wherein each of the comfort level training images is classified with a comfort level selected from a group comprising two or more of: no pain, mild discomfort, discomfort, extreme discomfort, pain, acute pain, and chronic pain.

9. The method according to claim 1, wherein the images form a sequence of video frames.

10. The method according to claim 1, wherein receiving the images comprises capturing one or more images of the feline with an image capture device.

11. The method according to claim 10, wherein the image capture device comprises a camera of a tablet computer or a camera of a smartphone.

12. An apparatus for generating a feline comfort level classification, the apparatus comprising a memory module storing instructions that when executed by a processor perform the method according to claim 1.

13. An apparatus according to claim 12, wherein the memory module comprises a memory of a tablet computer or a memory of a smartphone.

14. A method for generating a feline comfort level classification, the method comprising:
   receiving one or more images of a feline;
   generating a feline classification from the images with a feline classification model, wherein the feline classification corresponds to a feline type;
   selecting a face detection model from one or more face detection models, wherein the selected face detection model corresponds to the feline type;
   generating a positive facial indication for one or more of the images with the selected face detection model;

selecting a comfort level classification model from one or more comfort level classification models, wherein the selected comfort level classification model corresponds to the feline type; and generating a feline comfort level classification from the images with the selected comfort level classification model;

wherein generating the feline classification comprises:

generating a set of feline probabilities, wherein each of the feline probabilities corresponds to one of the images and comprises a feline type and a confidence interval; and generating the feline classification from the set of feline probabilities;

wherein generating the positive facial indication comprises:

selecting the feline probabilities from among the set of feline probabilities with a confidence interval higher than a second threshold confidence interval and a feline type corresponding to the feline classification;

selecting the images corresponding to the selected feline probabilities;

generating a set of facial probabilities, wherein each of the facial probabilities corresponds to one of the selected images and comprises a facial indication and a confidence interval; and generating the positive facial indication based at least in part on the set of facial probabilities.

15. The method according to claim 14, wherein generating the positive facial indication from the set of facial probabilities comprises:

selecting the facial probabilities from the set of facial probabilities with a confidence interval higher than a threshold confidence interval;

averaging the confidence interval of each of the selected facial probabilities to generate an average confidence interval; and verifying the average confidence interval exceeds a positive facial indication threshold.

16. A method for generating a feline comfort level classification, the method comprising:

receiving one or more images of a feline;

generating a feline classification from the images with a feline classification model, wherein the feline classification corresponds to a feline type;

selecting a face detection model from one or more face detection models, wherein the selected face detection model corresponds to the feline type;

generating a positive facial indication for one or more of the images with the selected face detection model;

selecting a comfort level classification model from one or more comfort level classification models, wherein the selected comfort level classification model corresponds to the feline type; and generating a feline comfort level classification from the images with the selected comfort level classification model;

wherein generating the feline classification comprises:

generating a set of feline probabilities, wherein each of the feline probabilities corresponds to one of the images and comprises a feline type and a confidence interval; and generating the feline classification from the set of feline probabilities;

wherein generating the feline comfort level classification comprises:

selecting the feline probabilities from the set of feline probabilities with a confidence interval higher than a threshold and a feline type corresponding to the feline classification;

selecting the images corresponding to the selected feline probabilities;

generating a set of comfort level probabilities comprising, for each one of the selected images, a comfort level and a confidence interval; and generating the feline comfort level classification based at least in part on the set of comfort level probabilities.

17. The method according to claim 16, wherein generating the feline comfort level classification from the set of comfort level probabilities comprises:

selecting the comfort level probabilities from among the set of comfort level probabilities with a confidence interval higher than a threshold comfort confidence interval;

averaging the confidence interval of each of the selected comfort level probabilities for each comfort level; and generating the feline comfort level classification based at least in part on the comfort level with the highest average confidence interval.

* * * * *